United States Patent [19]

Thompson

[11] 4,432,820
[45] Feb. 21, 1984

[54] PROCESS FOR PRODUCTION OF POLYESTER-POLYOLEFIN FILM LAMINATES

[75] Inventor: Kenneth P. Thompson, Canton, N.C.

[73] Assignee: Champion International Corporation, Stamford, Conn.

[21] Appl. No.: 475,464

[22] Filed: Mar. 14, 1983

Related U.S. Application Data

[63] Continuation of Ser. No. 362,665, Mar. 29, 1982, abandoned, which is a continuation of Ser. No. 185,778, Sep. 10, 1980, abandoned.

[51] Int. Cl.³ ............................................. B32B 31/26
[52] U.S. Cl. .................................... 156/82; 156/243; 156/244.11; 156/244.23; 156/244.24
[58] Field of Search .................. 156/82, 243, 244.11, 156/244.23, 244.24; 428/481, 483; 264/80

[56] References Cited

U.S. PATENT DOCUMENTS

| | | | |
|---|---|---|---|
| 3,075,868 | 1/1963 | Long | 264/80 |
| 3,188,265 | 6/1965 | Charbonneau et al. | 161/188 |
| 3,360,412 | 12/1967 | James | 156/229 |
| 3,391,070 | 7/1968 | Morgan | 204/168 |
| 3,431,135 | 3/1969 | Keane et al. | 117/46 |
| 3,590,107 | 6/1971 | Smith et al. | 264/80 |
| 3,640,788 | 2/1972 | Flynn | 156/82 |
| 3,783,062 | 1/1974 | Martin | 156/82 |
| 3,823,061 | 7/1974 | Frayer et al. | 161/254 |
| 3,924,013 | 12/1975 | Kane | 156/244.23 |
| 3,925,591 | 12/1975 | Breitenfellner et al. | 428/483 |
| 3,959,567 | 5/1976 | Bradley | 428/461 |

FOREIGN PATENT DOCUMENTS 38-18531 of 1963 Japan.

*Primary Examiner*—Caleb Weston
*Attorney, Agent, or Firm*—Evelyn M. Sommer

[57] ABSTRACT

A process for the production of a permanently bonded polyester-polyolefin film laminate is disclosed herein. The process involves exposing the surface of polyester or polyolefin film to contact with a flame so as to prime the surface thereof and thereafter coating the primed surface of the film with a layer of a molten polyolefin or polyester, respectively. Flame priming of the polyester or polyolefin film results in a permanent surface modification of the film. Thus, the time lapse between the priming of the polyester or polyolefin film and the subsequent coating with the molten polymer may be a matter of days, if desired.

Multi-layer laminates which comprise a substrate-polyester-polyolefin laminate, e.g., paperboard-polyester-polyolefin laminates, can be provided by the process of the present invention by providing a previously formed laminate of a substrate and a polyester film and flame priming the polyester surface of the laminate. Thereafter, a layer of a molten polyolefin is coated onto the primed polyester surface.

8 Claims, No Drawings

PROCESS FOR PRODUCTION OF POLYESTER-POLYOLEFIN FILM LAMINATES

This application is a continuation, of application Ser. No. 362,665, filed Mar. 29, 1982, abandoned, which in turn is a continuation of application Ser. No. 185,778, filed Sept. 10, 1980, now abandoned.

BACKGROUND OF THE INVENTION

FIELD OF THE INVENTION

The present invention is directed to a process for the production of a permanently bonded polyester-polyolefin film laminate wherein the need for interlaminate adhesives is obviated. More specifically, the present invention is directed to a process for the production of a polyester-polyolefin laminate wherein a polyester or a polyolefin film is treated in order to prime the surface thereof for the subsequent coating of a molten layer of a polyolefin or a polyester, respectively.

BACKGROUND OF THE PRESENT INVENTION

Considerable attention has been focused in recent years on the production of strong, heat-sealable, synthetic polymer films having barrier properties. Polyester films have found extensive use as packaging materials since they provide great strength and desirable barrier properties. However, the polyesters are not readily heat sealable and therefore cannot be utilized for applications when such property is required.

It has been proposed to laminate a film of a heat sealable polyolefin, such as polyethylene, to a polyester film by co-extrusion in order to provide a heat-sealable laminate having the strength and barrier properties of a polyester film. However, attempts to co-extrude polyester and polyolefin films have produced laminates with insufficient interlayer adhesion to be practical for commercial use. Similarly, attempts to laminate a previously formed film of a polyester to a previously formed film of a polyolefin have required the use of adhesives and other modifications. Thus U.S. Pat. No. 3,925,591 to Breitenfellner et al discloses the production of a polyester-polyolefin film laminate. However, an ethylene-vinyl acetate copolymer interlaminate adhesive is utilized. Accordingly, the production of polyester-polyolefin laminate film presents numerous difficulties.

According to U.S. Pat. No. 3,188,265 to Charbonneau et al, a polyester-polyolefin laminate is formed by extrusion coating of a polyester film, and the resulting laminate is thereafter irradiated with ultraviolet radiation of specified wavelengths under conditions of increased temperature for 5 to 6 seconds. However, attempts to "prime" the polyester film by exposure to UV radiation and thereafter coat the prime film with extruded, molten polyolefin were reported to be unsuccessful.

It would be desirable to provide a process for the production of a polyester-polyolefin film laminate wherein no interlaminate adhesive is needed and wherein a permanently bonded laminate can be produced without the need for time consuming post-production UV treatment.

SUMMARY OF THE INVENTION

According to the present invention there is provided a process for the production of a permanently bonded polyester-polyolefin film laminate which comprises exposing the surface of a previously formed polyester or polyolefin film to contact with a flame for a time sufficient to prime the surface thereof and thereafter coating the primed surface of the film with a layer of a molten polyolefin or polyester, respectively. Flame priming of the polyester or polyolefin film results in a permanent surface modification of the film. Thus, the time lapse between the priming of the polyester or polyolefin film and the subsequent coating with the molten polymer may be a matter of days, if desired.

Additionally, multi-layer laminates which comprise a substrate-polyester-polyolefin film laminate, such as, e.g. paperboard-polyester-polyolefin laminates, can be provided by the process of the present invention by providing a previously formed laminate of a substrate and a polyester film and flame priming the polyester surface of the laminate. Thereafter, a layer of a molten polyolefin is coated onto the primed polyester surface.

DETAILED DESCRIPTION OF THE PREFERRED EMBODIMENTS

Any of the various film forming polyesters may be utilized in the process of the present invention. Thus, film forming polyesters resulting from the reaction of: (1) a glycol such as ethylene-, propylene-, diethylene-, dipropylene-, or butylene glycol, etc.; with (2) an acid or anhydride such as adipic acid, azelaic acid, terephthalic acid, phthalic acid, isophthalic acid, etc., may be utilized in the present invention. Preferred polyesters for use in the present invention are the film forming polyethylene terephthalates and the film forming co-polyesters based on polyethylene terephthalate.

As indicated previously, either polymeric film, i.e., the polyester or polyolefin, may be primed by flame treatment. However, it is advantageous to flame prime the surface of a polyester film and contact the primed surface with molten polyolefin, particularly when it is desired to produce a three-layered laminate, i.e., polyolefin-polyester-paperboard since a previously formed paperboard-polyester laminate can be readily provided by conventional means and the polyester layer treated by the process of this invention. Flame priming of the polyester film surface may be conducted under a variety of conditions. Thus, a polyester film may be cast inline and exposed to a flame in order to prime the surface thereof while supported by a cooling roll. Alternatively, a previously formed polyester film may be flame primed in a subsequent operation. As indicated above, a polyester-paperboard laminate formed in a previous conventional operation may be passed with the polyester surface in contact with the flame in order to prime the surface thereof. Thus, the polyester film may be a lamina or layer of a laminate and, as used herein, the term "film" is intended to include such lamina.

Any of various combustible hydrocarbon-oxygen mixtures may be utilized to provide the flame. A normal flame resulting from such mixtures consists of an inner or primary flame portion surrounded by an outer or secondary portion of the flame. In practicing the process of the present invention, it is preferable to contact the polyester surface with the secondary portion of the flame just above the termination of the primary portion of the flame. The temperature in this area of the flame is generally within the range of about 1700° F. to about 1900° F. While other areas of the flame may be successfully utilized, the efficacy of flame treatment falls off very rapidly as distance from the primary-secondary flame interface increases.

The surface of the polyester film should be exposed to the flame for a time less than that which will cause substantial deformation of the film. Accordingly, the temperature of the polyester film must be maintained below the melting point of the polyester, and this is controlled by adjusting the rate at which the film is fed across the flame. Thus, a polyester film surface can be contacted with the secondary portion of a flame in the vicinity of the termination of the primary portion of the flame for any suitable length of time and the resulting polyester surface will be primed so as to allow production of a permanently bonded polyester-polyolefin laminate when a molten layer of polyolefin is subsequently coated thereupon. For example, it has been found that polyester surfaces can be exposed to a flame for a period of time as short as 0.006 second to produce the desired priming effect. Even this short time period is not believed to represent an absolute minimum for the period of flame contact with the polyester surface and still provide adequate priming. The adequacy of the flame priming treatment, based on a particular time period of exposure to the flame, can readily be determined by conducting the flame priming of a polyester film sample for a pre-determined time, coating the primed polyester film with molten polyolefin and testing the resultant laminate for delamination.

The polyolefin coating may be applied to the primed polyester surface while the polyester is still warm as a result of the flame contact or may be applied after a lapse of time of up to several days. The polyolefin should be applied to the primed polyester surface in the form of a molten layer in order to insure proper polyester-polyolefin contact. A preferred method for providing a molten coating of a polyolefin is the well known process of extrusion coating which comprises continuously feeding the polyester film with its primed surface past a station at which the molten polyolefin coating is extruded onto the polyester surface.

Extrusion coating apparatus which may be utilized in the present invention are well known in the art. Suitable extrusion coating apparatus are discussed in *Modern Plastics Encyclopedia*, 1979–1980, Vol. 56, No. 10A, pps. 247–248, which pages are hereby incorporated by reference.

Any of the various heat-sealable film forming polyolefin polymers or copolymers may be utilized in accordance with the present invention. For instance, low or medium density polyethylene, polypropylene, ethylene-propylene copolymers and heat sealable copolymers of ethylene with, e.g., vinyl acetate, methyl acrylate, ethyl acrylate or acrylic acid, etc. which comprise polyethylene as a major component may be utilized in the present invention. Thus, any of the various heat sealable polyolefin homopolymer or copolymer film forming resins may be utilized in the present invention in order to provide a molten coating of a polyolefin. However, preferred polyolefins for use in the present invention comprise polyolefin homopolymers, e.g., polyethylene, or copolymers wherein both coreactants are olefins, e.g, ethylene-propylene copolymers. An especially preferred polyolefin is polyethylene.

An especially preferred embodiment of the present invention relates to the production of a paperboard-polyester-polyolefin laminate. Such a laminate may be provided in accordance with the present invention by flame priming the polyester surface of a polyester-paperboard laminate and thereafter extrusion coating a molten layer of polyolefin onto the polyester-paperboard laminate. The provision of the paperboard-polyester laminate is accomplished through conventional means such as are known to those skilled in the art. Thus, a polyester layer may be extruded onto a paperboard which may have been pretreated by means of, e.g., flame treatment or corona discharge treatment prior to the application of the polyester coating. Likewise, the paperboard used may be any conventional paperboard known to those skilled in the art.

Production of permanently bonded polyester-polyolefin laminates wherein the surface of a previously formed polyolefin film is flame primed and a molten film of a polyester is subsequently coated onto the primed surface is conducted in the same manner as priming of a polyester film and coating with a molten polyolefin as previously described. Thus, the polyolefin film may be composed of any of the polyolefin polymers or copolymers previously described. Likewise, the molten layer of polyester may be composed of any of the polyester containing polymers and copolymers previously described.

Flame priming of the polyolefin film is conducted in the same manner as previously described regarding flame priming of polyester films, i.e., the polyolefin film temperature must be maintained below the polyolefin melting point. However, because the polyolefins melt at lower temperatures than do the polyesters, somewhat greater care must be exercised in flame priming the polyolefin films so as to avoid substantial deformation of the film. Thus, it may be necessary to shorten length of flame contact and/or to provide a cooled chill roll support during flame treatment of the film.

The polyester-polyolefin laminates produced in accordance with the present invention may be used to provide easily heat sealed polyester structures which are compatible with or substitutable for any of the previously known heat sealable containers. For instance, a milk carton type container may be provided through the utilization of the paperboard-polyester-polyolefin laminate discussed previously.

EXAMPLE 1

A cast polyethylene terephthalate film having a thickness of 0.001 inch and a width of 72 inches is continuously passed over a propane-oxygen flame issuing from a ribbon burner such as a linear burner comprising a slot packed with corrugated metal so positioned to form a plurality of burner ports (commercially available from Flynn Burner Co.), or a linear burner comprising drilled ports (commercially available from Wiess Engineering Co.). The ribbon burner has the same length as the width of the polyester film and provides a flame having a width of one-half inch. The polyester film is passed across the flame at a speed of approximately 800 feet per minute and the flame is adjusted so that the secondary portion of the flame just above the termination of the primary portion is in contact with the polyester film. The thus primed polyester film is collected on a take-off roll and stored for one day.

The primed polyester film is thereafter coated with a molten layer of low density polyethylene by means of extrusion coating. The primed polyester film is passed beneath an extrusion coating apparatus (manufactured by Black Clawson Co.) at a speed of about 800 feet per minute to provide a polyethylene layer having a thickness of about 0.0008 inch. The thus formed laminate is thereafter passed through the nip of a chill roll and stored on a take-up roll.

A sample of the thus formed laminate is tested by means of physically attempting to pull apart the two film layers. No delamination of the polyethylene and polyester is observed.

EXAMPLE 2

A paperboard-polyester-polypropylene laminate is to be formed. A paperboard-polyethylene terephthalate laminate is provided by exposing a 215 pound paperboard substrate to corona discharge and thereafter coating the paperboard with polyethylene terephthalate to provide a polyethylene terephthalate layer having a thickness of about 0.00135 inch.

The paperboard-polyester laminate is passed into contact with a one-half inch width flame issuing from a ribbon burner. The paperboard-polyester laminate is passed across a linear burner at a speed of approximately 800 feet per minute so as to provide contact of the polyester surface with the secondary portion of the flame in the vicinity of the termination of the primary cone of the flame.

The thus primed paperboard-polyester laminate is stored for one hour and thereafter passed under an extrusion coating apparatus (manufactured by Black Clawson Co.) at a speed of 800 feet per minute. A molten film of polypropylene issues from the extrusion coating apparatus to provide a polypropylene layer having a thickness of about 0.00075 inch upon the polyester surface. The laminate is passed across a chill roll and stored.

A sample of the thus produced laminate is tested by physically attempting to peel the various layers. No delamination was observed.

EXAMPLE 3

The paperboard-polyester substrate utilized in Example 2 is to be coated with medium density polyethylene. The substrate is flame primed as in Example 2 and thereafter passed under an extrusion coating apparatus from which issues a molten film of medium density polyethylene to provide a polyethylene layer having a thickness of about 0.00125 inch. The thus formed laminate is passed across the nip of a chill roll and stored. The three layer laminate is tested to determine the lamination strength. No delamination was observed.

Although the invention has been described in considerable detail with particular reference to certain preferred embodiments thereof, variations and modifications can be made without departing from the invention as previously described and defined in the appended claims.

What is claimed is:

1. A process for producing a permanently bonded laminate comprising polyester and polyolefin layers which consists essentially of:
    (A) providing a preformed polyester or a heat-sealable polyolefin film;
    (B) contacting a surface of said film with the secondary portion of a flame in the vicinity of the termination of the primary portion of the flame, said flame being produced from a combustible hydrocarbon-oxygen mixture and having a temperature in the range of about 1700° F. to about 1900° F., so as to prime the surface of the film;
    (C) storing the primed film; and
    (D) coating the stored film with a layer of molten polymer, said molten polymer being a heat-sealable polyolefin when the film is a polyester film and a polyester when the film is a polyolefin.

2. The process of claim 1, wherein said film is a polyester film.

3. The process of claim 2, wherein said polyester is polyethylene terephthalate.

4. The process of claim 3, wherein said molten polyolefin comprises polyethylene.

5. The process of claim 2, wherein the polyester film is a lamina of paperboard-polyester laminate.

6. The process of claim 5 wherein said polyolefin comprises polypropylene.

7. A process for producing a permanently bonded laminate comprising polyester and polyolefin layers which consists essentially of:
    (A) providing a preformed polyester film;
    (B) contacting a surface of said film with the secondary portion of a flame in the vicinity of the termination of the primary portion of the flame, said flame being produced from a combustible hydrocarbon-oxygen mixture and having a temperature in the range of about 1700° F. to about 1900° F., at least for a time sufficient to prime said surface of the film but for a time less than that which will cause substantial deformation of the film, whereby said film need not be in contact with a cooling roller when contacted by the flame; and
    (C) coating the primed surface of the film with a layer of molten polymer, said molten polymer being a heat-sealable polyolefin.

8. The process of claim 7 wherein the film is passed over the flame at a speed of about 800 feet per minute.

* * * * *